UNITED STATES PATENT OFFICE.

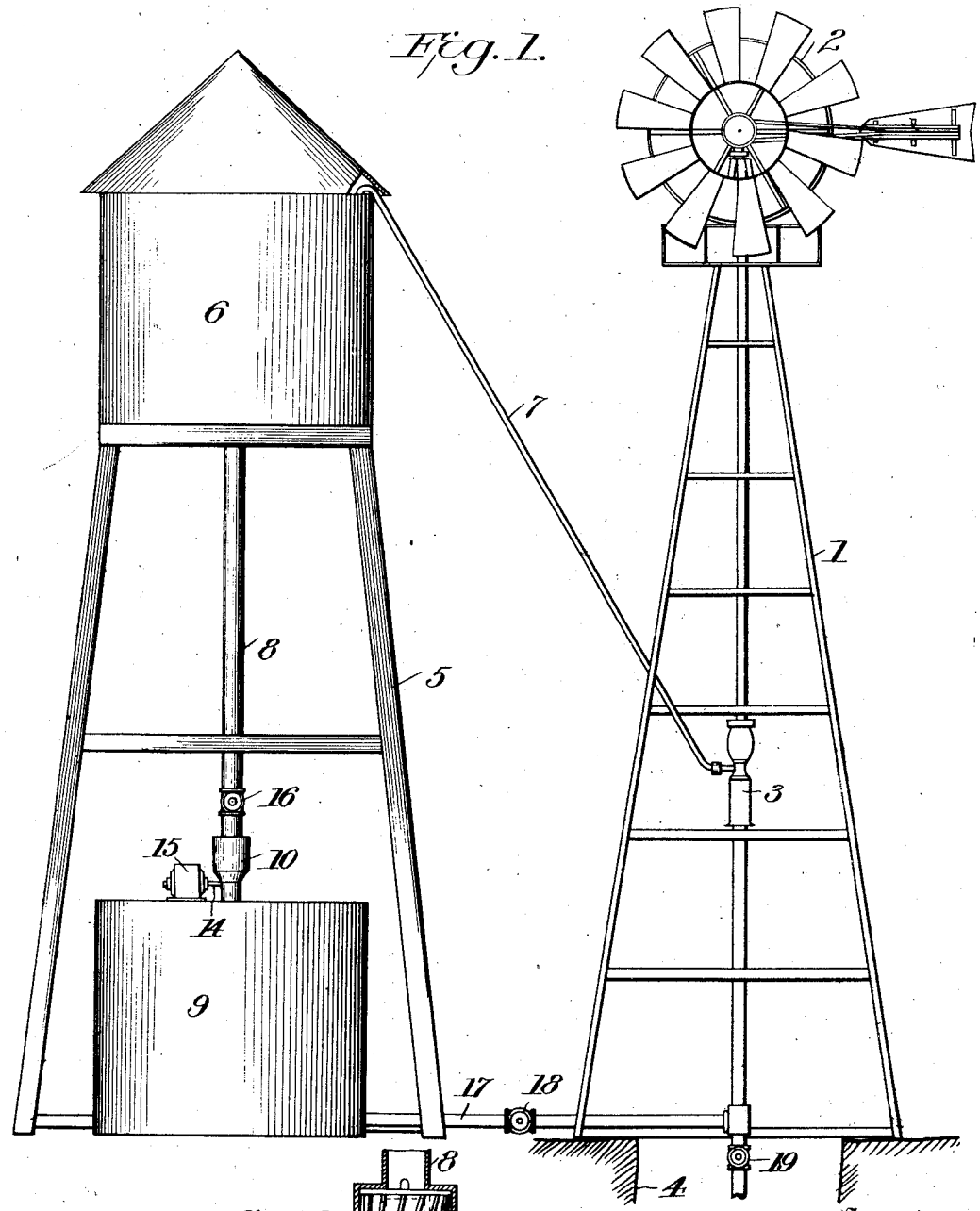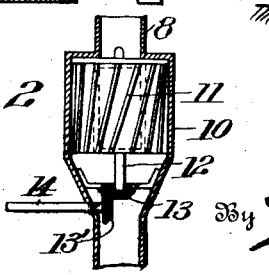

WILLARD B. CLEMENTS, OF VEEDUM, WISCONSIN.

APPARATUS FOR GENERATING ELECTRIC CURRENTS.

1,010,591.  Specification of Letters Patent.  Patented Dec. 5, 1911.

Application filed December 13, 1909. Serial No. 532,893.

*To all whom it may concern:*

Be it known that I, WILLARD B. CLEMENTS, a citizen of the United States, residing at Veedum, in the county of Wood and State of Wisconsin, have invented certain new and useful Improvements in Apparatus for Generating Electric Currents, of which the following is a specification.

This invention relates to apparatus for generating electric currents.

One object of my invention is to provide a wind mill with means whereby an electric current may be generated under the influence of the wind. In view of the fact that wind is higher in the middle of the day than in the evening, and in view of the fact that the wind frequently blows in "gusts", resulting in a variableness in the speed of the wind, I have arranged my apparatus or machine whereby I will have an even flow of the water under varying speeds of the wind or in the absence of wind, and thus provide for an efficient generation of electricity.

With the above and other objects in view, the present invention consists in the combination and arrangement of parts hereinafter more fully described, illustrated in the accompanying drawings, and particularly pointed out in the appended claim, it being understood that changes may be made in the form, proportion, size and minor details, without departing from the spirit or sacrificing any of the advantages of the invention.

In the drawings:—Figure 1 is an elevation of my invention. Fig. 2 is a detail sectional view of the casing inclosing the turbine.

Referring now more particularly to the accompanying drawings, the reference character 1 indicates a wind mill supporting frame upon which is mounted any common type of wind mill mechanism 2 having connection with the pump 3 so that upon operation of the wind mill incident to wind, water will be lifted from the well 4 upwardly by the pump 3.

The character 5 indicates a framework upon which is mounted a tank 6 which has communication with the pump by way of the pipe 7.

The water lifted to the tank 6 is discharged through the pipe 8 into a tank 9 arranged beneath the tank 6, the pipe 8 having a casing 10 at its lower end to inclose a turbine 11, disposed preferably immediately above the tank 9. As the water falls through the pipe 8, it causes rotation of the turbine 11, which rotates the shaft 12 and through the instrumentality of the beveled gears 13, 13' causes rotation of the shaft 14 to operate the dynamo 15 for the generation of electricity for various uses. The pipe 8 is provided with a valve 16 so that the flow of water from the tank 6 may be cut off when desired. Leading from the tank 9 to the pump barrel 3 is a pipe 17 provided with a valve 18. Thus, both tanks 6 and 9 have communication with the well by way of the pump 3.

In the middle of the day when the wind is usually higher than at other times, or at any other period, when the wind mill is operating to such a degree as to lift water from the well, both valves 16 and 18 are opened. Under these conditions, the water is lifted from the well by the pump 3 and passes upwardly through the pipe 7 into the tank 6 which latter falls through the pipe 8 onto the turbine 11, causing consequent operation of the dynamo for the generation of electricity. The water passes over the turbine 11 and into the tank 9 from which latter it passes through the pipe 17 to the pump 3, and if the power of the wind mill is strong enough to lift water from the well, it will also cause the water passing through the pipe 17 to be lifted with the water from the well and pass through the pipe 7 to the tank 6. If the power of the wind mill is not sufficient to lift the water from the well, it will lift the water passing through the pipe 17 and return it to the tank 6 by way of the pipe 7, whereby there is a continuous flow of water through the pump, tanks 6 and 9 and the pipes 8 and 17, whether the wind be high or low.

If desired, I may provide the pump cylinder with a valve 19 so that the only water used for the generation of elctricity will be continuously circulated through the pump and tanks 6 and 9 by way of the pipes 7, 8 and 17, without intermingling water from the well, even though the power of the wind mill be sufficient to raise water from the well. It is preferable, however, to lift water from the well when the wind mill has sufficient power to do so.

The invention is particularly adapted for generating electricity for the lighting of houses, barns or to run milking machines, saw mechanisms or other tools, and in the event that the wind should not be strong enough at night for the generation of electricity to light houses, barns, etc., the valve 16 may be cut off and the tank 6 filled with water while the wind is blowing, which can be stored in the tank 6 for use at night. At night when it is desired to generate electricity, the valve 16 may be opened and water permitted to flow down over the turbine 11 to operate the dynamo 16. The tank 6, of course, will be of such dimensions as to hold sufficient quantities of water to provide for operation of the dynamo a sufficient length of time for lighting or other purposes. If all three valves 16, 18 and 19 are open at night time, there will be a continuous flow of water through the tanks 6 and 9, if the wind mill operates, and if the wind mill mechanism should not be set out of operation and a "gust" of wind should come up at night, the operation of the machine would not be affected nor would the evenness of the flow of the water be disturbed, as regards its passage over the turbine 11.

It is not necessary to have the present invention coupled up with a well at all. The pipe 17 may lead directly into the pump, and water first delivered to the device from an eaves trough (not shown), the water being first fed into the upper tank 6 and circulated through both tanks, the pump and pipe connections.

What is claimed is:—

The combination of a windmill, a pump operated thereby, upper and lower tanks, a pipe leading from the pump upwardly to the top of the upper tank to establish communication between the pump and upper tank, a vertical valved pipe connection between the upper and lower tanks, a turbine disposed in the line of the valved vertical pipe for operation under the influence of water passing from the upper to the lower tank, a dynamo disposed on the lower tank and having operative connection with the turbine, and a substantially horizontally disposed valved pipe leading from the bottom of the lower tank to the casing of the pump, the casing of the pump having a valve below said substantially horizontally disposed pipe, whereby water may be continuously circulated through said tanks and the upper portion of said pump and the connections between the tanks and the pump whether the valve of the pump casing be opened or closed.

In testimony whereof I affix my signature in presence of two witnesses.

WILLARD B. CLEMENTS.

Witnesses:
F. S. WOODWORTH,
M. KING.